J. J. MURRAY.
AIRPLANE CONSTRUCTION.
APPLICATION FILED AUG. 17, 1917.

1,270,649.

Patented June 25, 1918.

WITNESSES

INVENTOR
J. J. Murray
BY Victor J. Evans
ATTORNEY

UNITED STATES PATENT OFFICE.

JAMES JOSEPH MURRAY, OF NEW YORK, N. Y.

AIRPLANE CONSTRUCTION.

1,270,649.  Specification of Letters Patent.  Patented June 25, 1918.

Application filed August 17, 1917. Serial No. 186,787.

*To all whom it may concern:*

Be it known that I, JAMES JOSEPH MURRAY, a citizen of the United States, residing at New York city, in the county of New York and State of New York, have invented new and useful Improvements in Airplane Constructions, of which the following is a specification.

This invention relates to airplanes and particularly the frame work or construction, the object of the invention being to produce a structure in which the main elements of the aircraft are coupled or yoked together by a pair of main engine bearers or master beams, the arrangement being such that the engine, the landing gear, the supporting wings and the body or nacelle are all connected to and carried by said bearers or master beams, and if desired the seat or seats for the aviator and another person or persons may be supported by the same bearers or master beams.

With the above and other objects in view, the invention consists in the novel construction, combination and arrangement of parts, herein fully described, illustrated and claimed.

In the accompanying drawings:—

Figure 1:
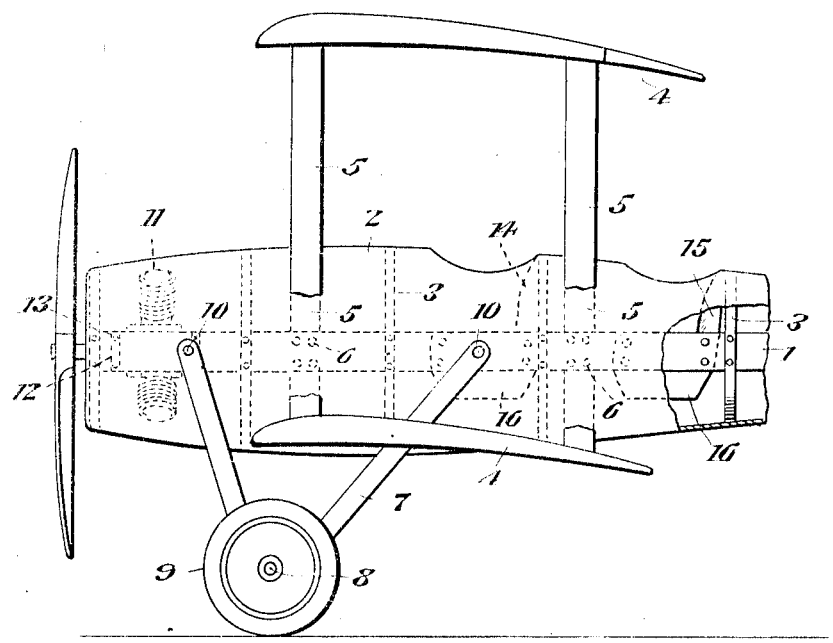
Figure 1 is a side elevation partly in section illustrating the improved construction.
Figure 2:
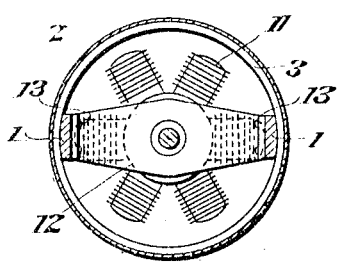
Fig. 2 is a vertical cross section through the same taken adjacent to the engine mounting.

The construction contemplated in this invention, comprises, in the preferred embodiment thereof, a pair of bearers or master beams 1 which extend longitudinally of the body or nacelle 2, within the same, and bolted or otherwise fastened rigidly to the transverse members 3 of the body.

The aerial supporting wings or planes 4 are connected by means of posts or struts 5 directly to the beams or bearers 1, being shown as secured thereto by fastening means 6. The landing gear or wheel base is shown as comprising a pair of V-shaped legs or hangers 7 supporting at their lower ends an axle 8 upon which is mounted a pair of wheels 9 located equidistantly from and on opposite sides of the vertical plane of the body 1. The legs or hangers 7 are connected rigidly by fastening means 10 directly to the bearers or master beams 1.

The engine 11 which is illustrated as of the multiple cylinder rotating type, similar to the well known Gnome engine embodies the usual mounting or engine bearers or frame 12 and said engine mounting is fastened between and directly to the main bearers or master beams 1 by fastening means 13. If desired the seats 14 and 15 for the aviator and observer or other occupant may also be fastened by braces or hangers 16 directly to the main beams or bearers 1.

From the foregoing description taken in connection with the accompanying drawings it will now be seen that those elements of an airplane which are subjected to the greatest stresses while in actual flight and while upon the ground are all connected directly to and coupled or yoked together by a pair of master beams or main bearers which are concealed within the body of the craft. The said main beams or bearers may be manufactured of any desired material such as wood either plain or laminated or reinforced, or metal of any desired shape or formation in cross section, having the necessary strength to withstand the stresses to which they are subjected while in flight or while landing or while the machine is traveling on the ground preparatory to making a flight. The construction described furthermore does away with a great deal of the wiring, trussing and bracing now resorted to to impart the necessary strength to the elements of an air-craft hereinabove enumerated.

I claim:—

1. In airplane construction, the combination of a closed body having a cock pit, one or more seats arranged in said cock pit, master beams extending longitudinally within said body and arranged at opposite sides of said seats, an engine mounting interposed between and fastened rigidly to said master beams, a landing base embodying axle supporting hangers fastened rigidly to said master beams, an aerial supporting surface, and struts connecting said aerial supporting surface directly to said master beams.

2. In airplane construction, the combination of a pair of master beams arranged in spaced relation to each other and extending substantially parallel to the normal line of flight, a body frame comprising a plurality of hoops encircling said master beams and fixedly secured thereto, a landing base embodying V-shaped members having the upper extremities thereof fixedly connected to said master beams, an aerial supporting surface, means connecting said supporting surface directly to said master beams, and an engine mounted between said master beams and directly supported thereby.

3. In airplane construction, the combination of a pair of master beams arranged in spaced relation to each other and extending substantially parallel to the normal line of flight, a body frame comprising a plurality of hoops encircling said master beams and fixedly secured thereto, a landing base embodying a frame which is fixedly secured to said master beams, an aerial supporting surface, and means connecting said supporting surface directly to said master beams.

In testimony whereof I affix my signature.

JAMES JOSEPH MURRAY.